United States Patent [19]

Swain et al.

[11] Patent Number: 5,415,032

[45] Date of Patent: May 16, 1995

[54] GAS METER

[75] Inventors: James C. Swain, Columbus; Larry E. Schluer, Sugar Grove; Donald L. Cooper, Columbus; Alan A. Alten, Baltimore, all of Ohio

[73] Assignee: Gas Research Institute, Chicago, Ill.

[21] Appl. No.: 205,049

[22] Filed: Mar. 2, 1994

[51] Int. Cl.$^6$ ............................................. G01F 3/20
[52] U.S. Cl. ..................................................... 73/268
[58] Field of Search ........................... 73/263, 268, 281

[56] References Cited

U.S. PATENT DOCUMENTS

| | | |
|---|---|---|
| 1,246,613 | 11/1917 | Knight . |
| 1,642,899 | 9/1927 | Simpson . |
| 1,898,253 | 2/1933 | MacLean et al. . |
| 2,088,270 | 7/1937 | McCandless . |
| 2,116,296 | 5/1938 | Zachariassen et al. . |
| 2,177,085 | 10/1939 | Wagner . |
| 2,223,555 | 12/1940 | Derbyshire et al. . |
| 2,281,671 | 5/1942 | Brown . |
| 2,296,476 | 9/1942 | McIntire . |
| 2,296,485 | 9/1942 | Whitworth . |
| 2,313,515 | 3/1943 | Brown . |
| 2,346,229 | 4/1944 | Ormerod et al. . |
| 2,367,735 | 1/1945 | Ormerod . |
| 2,544,665 | 3/1951 | Gilmore . |
| 2,599,514 | 6/1952 | Menkemeller ......................... 73/268 |
| 2,663,189 | 12/1953 | Butterworth et al. . |
| 2,667,147 | 1/1954 | Brown . |
| 2,725,747 | 12/1955 | Jansen et al. ............................ 73/268 |
| 2,741,122 | 4/1956 | Douglas . |
| 2,753,712 | 7/1956 | Douglas . |
| 2,778,224 | 1/1957 | Douglas . |
| 2,818,046 | 12/1957 | Evans . |
| 2,912,859 | 11/1959 | Douglas . |
| 2,932,198 | 4/1960 | Whitworth . |
| 3,069,927 | 12/1962 | Douglas et al. . |
| 3,119,264 | 1/1964 | St. Clair . |
| 3,132,513 | 5/1964 | Heffernan et al. . |
| 3,161,049 | 12/1964 | St. Clair et al. . |
| 3,166,937 | 1/1965 | Farrell . |
| 3,177,713 | 4/1965 | Hutchison et al. . |
| 3,177,714 | 4/1965 | Mayeran . |
| 3,216,253 | 11/1965 | Green . |
| 3,253,464 | 5/1966 | Evans et al. . |
| 3,261,206 | 7/1966 | Stewart . |
| 3,358,506 | 12/1967 | Rose . |
| 3,362,223 | 1/1968 | Stewart . |
| 3,371,532 | 3/1968 | Anderson . |
| 3,415,121 | 12/1968 | Douglas . |
| 3,455,173 | 7/1969 | Meyer .................................... 73/281 |
| 3,587,315 | 6/1971 | Burrett . |
| 3,589,189 | 6/1971 | Douglas . |
| 4,040,296 | 8/1977 | Douglas . |
| 4,091,668 | 5/1978 | Namikawa et al. . |
| 4,538,458 | 9/1985 | Bruce et al. . |
| 4,706,496 | 11/1987 | Hicks . |
| 4,747,306 | 5/1988 | Kiriloff . |
| 4,901,567 | 2/1990 | Bertke .................................... 73/268 |

Primary Examiner—Herbert Goldstein
Attorney, Agent, or Firm—Speckman, Pauley & Fejer

[57] ABSTRACT

A compact, 4-chamber gas meter comprising crankpost and valve drive mechanisms whereby each reciprocating valve moves from a stroke shifting point near center to a stroke endpoint and back to said stroke shifting point with each 180° rotation of the crankpost and each stroke of each diaphragm occurs over said 180° rotation of the crankpost.

12 Claims, 9 Drawing Sheets

VALVE AT SHIFTING POSITION NEAR CENTER

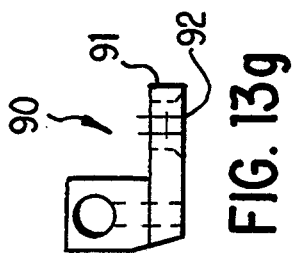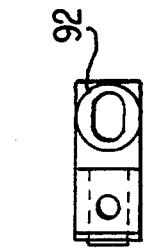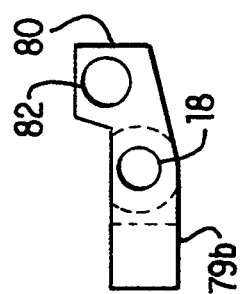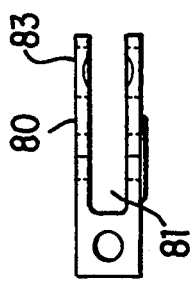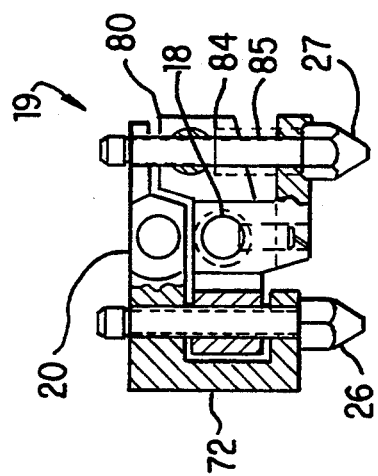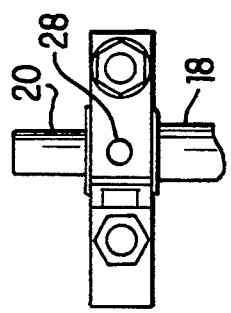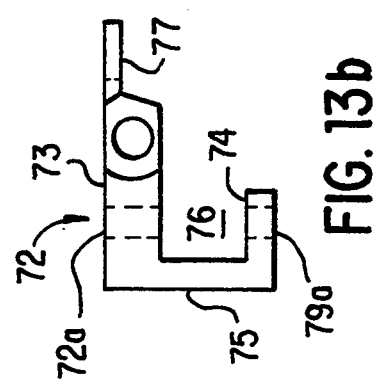

GAS METER

BACKGROUND OF THE INVENTION

1. Field of the Invention

This invention relates to a compact 4-chamber gas meter which provides the essential functions of a gas meter in a smaller volume, and, in particular, in a shallower depth, front to back. In particular, the gas meter of this invention comprises flag post to crankpost kinematics which provide good torque pulse characteristics within the constraints of a shallow meter box, valve drive kinematics which provide perfect coordination of valve timing with the ends of the strokes of the diaphragms of the gas meter, a lower box configuration which allows a molded plastic or die cast construction while accommodating rolling lobe diaphragms, and a valve plate with passages which accommodate a 4-chamber meter with parallel reciprocating valves.

2. Description of Prior Art

In a diaphragm-type gas meter, a quantity of gas is delivered through the reciprocation of measuring diaphragms by gas pressure. Generally, in this type of gas meter, the gas is introduced into a valve cage through an inlet port formed in the upper portion of the gas meter housing and alternately introduced into each measuring chamber formed in the lower portion of the housing through a distributing valve mechanism.

In a 4-chamber gas meter, the lower housing comprises two pairs of measuring chambers, each pair having a diaphragm which separates the measuring chambers. The motion of each diaphragm is controlled by a mechanism connecting that diaphragm to a crankpost. The mechanism and the crankpost, acting together, control the length of the stroke of each diaphragm and coordinate the timing of the stroke of each diaphragm to the stroke of the other diaphragm in the meter. Typically, an adjustment feature on the crankpost is provided to make small, precise changes to the length of the diaphragm stroke at the time of the final meter calibration. In some meters, temperature variations are compensated for by employing a bi-metallic device on the crankpost which varies the length of the stroke of the diaphragms in direct proportion to the absolute temperature of the gas being metered.

Each diaphragm has a corresponding valve in the meter. Valve opening is timed to begin to admit gas to the chamber on one side of the diaphragm when the diaphragm's position is approaching its minimum volume. The valve is timed to begin to exhaust gas from the chamber when the diaphragm is approaching the maximum volume of that chamber.

The timing of the valves is coordinated to the volume of the chambers by a mechanism that connects each valve to the crankpost. Typically, an adjustment feature on the crankpost for making small, precise changes to the valve timing at the time of final meter calibration is used. This adjustment allows for the advancement or retardation of the valve movements. Gas volume is measured by counting the revolutions of the crankpost. This is accomplished by a geared connection between the crankpost and a mechanical counting means.

Diaphragm meters of the type discussed hereinabove generally are taught by U.S. Pat. Nos. 4,091,668; 3,589,189; 3,587,315; 3,415,121; 3,261,206; 3,161,049; 2,932,198; 2,818,046; 2,741,122; 2,667,147; 2,663,189; 2,544,665; 2,367,735; 2,346,229; 2,313,515; 2,296,485; 2,296,476; 2,281,671; and 2,223,555.

Designing a 4-chamber gas meter which is compact, that is, having a small front-to-back dimension compared to traditional meters, requires the design of crankposts and valve drive mechanisms which overcome the kinematic problems associated with compact 4-chamber gas meters. U.S. Pat. No. 4,091,668 teaches a diaphragm-type gas meter having one crank plate on which a pair of diaphragm movement transmission levers are mounted and a second crank plate on which a pair of valve actuating levers which overlap each other rockably around the central axis of a crank shaft are pivotally mounted. The valve actuating levers are connected to a pair of valve members which reciprocate over a fixed angular range according to the rotation of a crank mechanism. U.S. Pat. No. 2,663,189 teaches a gas meter having two diaphragms operating flag rods disposed at diagonally opposite points in a plan view of the meter mechanism, each flag rod operating a gas transfer valve in such a way that the valve has a movement in an arc of a circle with the flag rod as its axis, and each valve being relatively long in a direction radial to the flag rod axis with its transfer passage in the said radial direction. U.S. Pat. No. 2,367,735 teaches a 4-chamber gas meter in which valves communicate with each main chamber through faces of the chamber which are not parallel to the diaphragm. U.S. Pat. No. 2,346,229 teaches a 4-chamber gas meter in which each diaphragm oscillates a spindle carrying an arm, the two arms rotating a crank spindle by which valve covers disposed parallel to each other are oscillated between the front and back of the meter along the same axis. And, finally, U.S. Pat. No. 3,589,189 teaches a 4-chamber gas meter having a pair of slide valves, operated by a valve actuating mechanism pivotally connected to a single throw crank in a manner which advances the valve timing to permit greater accuracy at higher volumes of flow.

A 4-chamber meter produces the most uniform driving torque from the diaphragms to the crankpost if the motion of the two diaphragms is essentially 90° out of phase. It is also highly desirable that the motion of the two diaphragms is delivered to the crankpost through a common crankpin. So doing allows the stroke adjustment to be uncomplicated while still influencing the length of both diaphragm strokes. It is also desirable that the links which connect the flag arms to the crankpin have a substantially greater length than the diameter of the crankpin motion. So doing helps to further improve the uniformity of driving torque. It is also desirable that each stroke of each diaphragm, where the inward motion of a diaphragm is a stroke and the outward motion is another stroke, occur over 180° of crankpost rotation. In this way, a valve drive mechanism can be designed which assures the valve timing is equally coordinated to the ends of all four diaphragm strokes. None of the prior art references of which we are aware teaches a crankpost and valve drive mechanism which satisfies these criteria within a compact 4-chamber gas meter.

SUMMARY OF THE INVENTION

Accordingly, it is an object of this invention to provide a compact 4-chamber gas meter having the features discussed hereinabove.

These and other objects of this invention are achieved by a gas meter having a housing with an inlet passage and an outlet passage, a front pair of meter chambers disposed in a front area of the lower portion of the housing and a back pair of meter chambers disposed in the back area of the lower portion of the housing, the front and back areas separated by a partition, and a first and second reciprocating valve disposed above the meter chambers in a side-by-side relationship, whereby the meter chambers alternately communicate with the inlet passage and the outlet passage and the strokes of the valves are parallel to each other. A front diaphragm disposed in the lower portion of the housing separates the front meter chambers into an innermost front meter chamber adjacent the partition and an outermost front meter chamber and a back diaphragm disposed in the lower portion of the housing separates the back meter chambers into an innermost back meter chamber adjacent the partition and an outermost back meter chamber. Each diaphragm corresponds to one of the first and second valves.

A crankpost mechanism and a valve drive mechanism are provided for actuating the first and second valves. The crankpost mechanism comprises a back flag arm operably connected at one end to the back diaphragm and a front flag arm operably connected at one end to the front diaphragm. A back flag arm connecting link is pivotally connected at one end to the free end of the back flag arm and, similarly, a front flag arm connecting link is pivotally connected at one end to the free end of the front flag arm. The ends of the connecting links distal from the ends connected to the flag arms are pivotally connected to a crankpin which, in turn, is eccentrically disposed and pivotally connected to an adjustment mechanism. A crankpost is rotationally centered with respect to and connected at one end to the adjustment mechanism. The two flag arms are equal in length as are the two connecting links.

The valve drive mechanism comprises a first crankthrow connected at one end to the crankpost. A first valve crank link is pivotally connected at one end to the opposite end of the first crankthrow and a first valve intermediate arm is pivotally connected to the opposite end of the first valve crank link intermediate the ends of the first valve intermediate arm. A second crankthrow is mechanically linked through the first crankthrow to the crankpost. A second valve crank link is pivotally connected at one end to that end of the second crankthrow opposite the end connected to the first crankthrow. A second valve intermediate arm is pivotally connected to the opposite end of the second valve crank link intermediate the ends of the second valve intermediate arm. A first valve drag link is pivotally connected at one end to one end of the first valve intermediate arm and a second valve drag link is pivotally connected at one end to one end of the second valve intermediate arm. The opposite ends of each of the first and second valve intermediate arms pivot on a common pivot pin which is grounded in the top deck mechanism bracket. The opposite ends of the first and second valve drag links are connected to one of the first and second valves. Such a crankpost and valve drive mechanism provides a means for driving the valves and the diaphragms of the meter in accordance with one embodiment of this invention whereby each valve moves from a shifting or timing point near the midpoint to a stroke end point and back to said shifting or timing point with each 180° rotation of the crankpost and each stroke of each diaphragm occurs over the same 180° rotation of the crankpost.

In accordance with one embodiment of this invention, the lower portion of the housing is separated between the front pair of meter chambers and back pair of meter chambers by a lower housing partition which forms a center feed chamber between the front pair of meter chambers and the back pair of meter chambers. The center feed chamber is partitioned into two subchambers where one of the subchambers is in communication with the innermost front meter chamber of the front pair of meter chambers and the first valve and the other subchamber is in communication with the innermost back meter chamber of the back pair of meter chambers and the second valve. In a particularly preferred embodiment, the lower housing partition in cross-section comprises two U-shaped segments, the base portions of which are connected to each other by a straight piece. One leg of each U-shaped portion comprises a separate structural element having an opening which forms a communication between the center feed chamber and the innermost front meter chamber on one side of the partition and the center feed chamber and the innermost back meter chamber on the opposite side of the partition.

In accordance with one embodiment of this invention, the adjustment mechanism by which the length of the strokes is adjusted by changing the distance between the crankpost axis of rotation and the crankpin and by which the phase relationship is varied by shifting the crankpin angularly relative to its position on the crankpost comprises a frame member pivotally connected to the crankpin and a center block pivotally connected to the crankpost. The frame member and the center block are mechanically linked whereby the frame member can be rotated on the crankpin relative to the center block.

BRIEF DESCRIPTION OF THE DRAWINGS

These and other features of this invention will be better understood from the following detailed description taken in conjunction with the drawings wherein:

FIGS. 13a-h show an adjustment mechanism and the components thereof for a gas meter in accordance with one embodiment of this invention.

DESCRIPTION OF PREFERRED EMBODIMENTS

Figure 1:
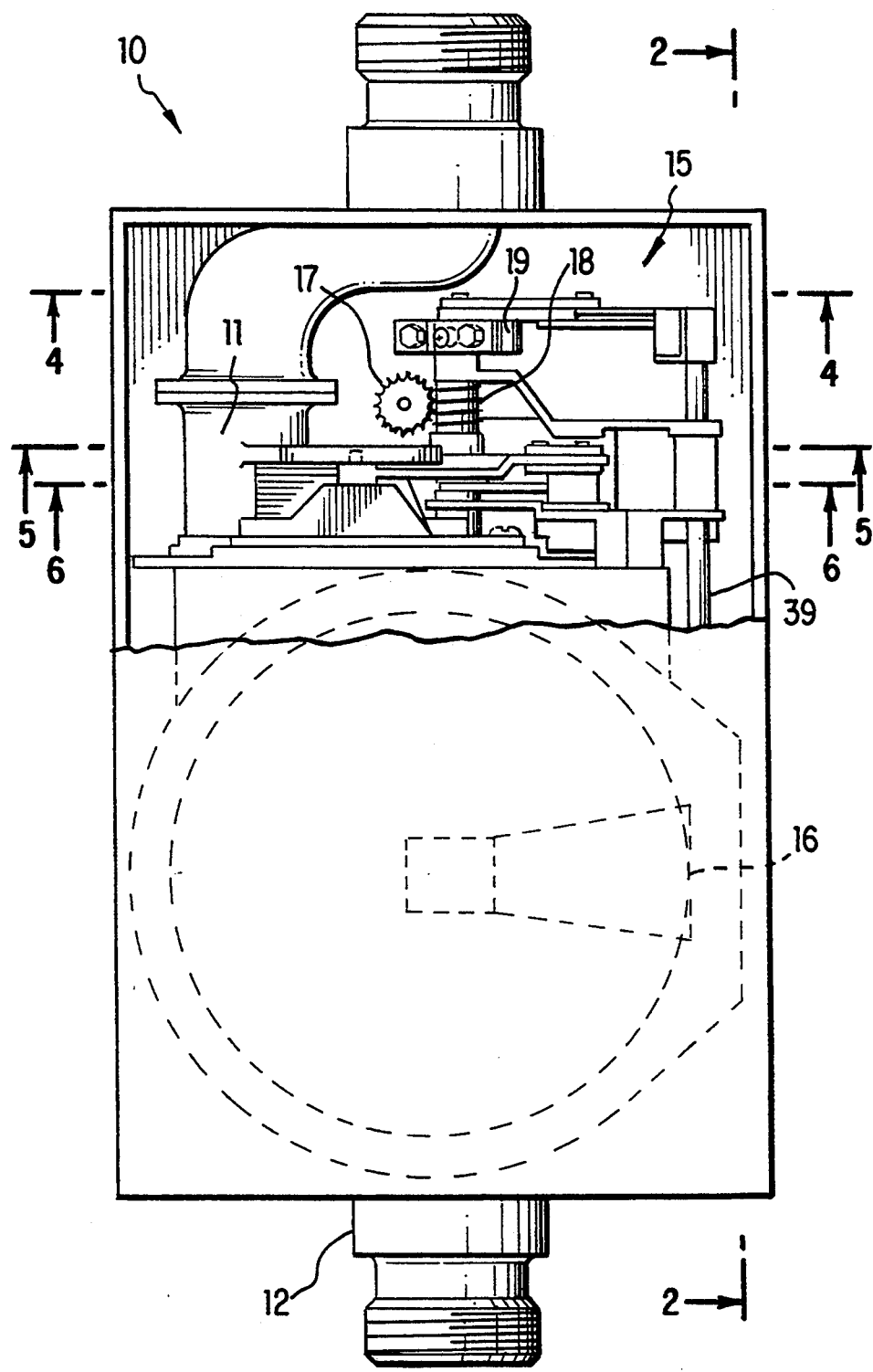
FIG. 1 is a rear view with cutaway of a 4-chamber gas meter in accordance with one embodiment of this invention.
Figure 2:
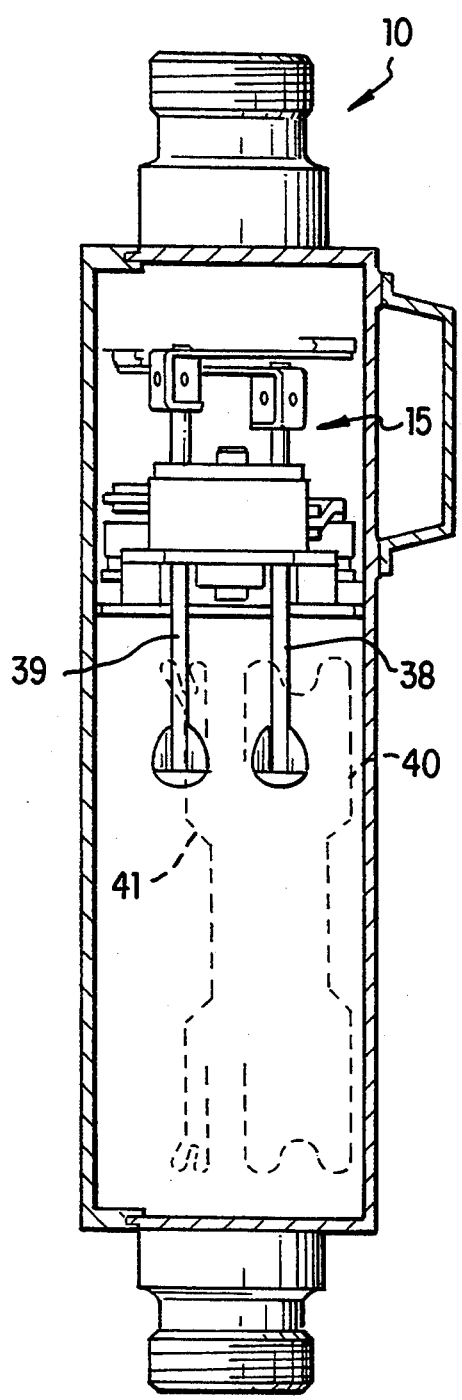
FIG. 2 is a side view of the meter shown in FIG. 1 along the line 2—2.

FIG. 1 is a diagram of a 4-chamber compact gas meter in accordance with one embodiment of this invention. The gas meter, generally designated as element 10, comprises a gas inlet 12 and a gas discharge 11. Crankpost and valve drive mechanism 15 is operationally linked through adjustment mechanism 19 to crankpost 18 and gear 17. Gear 17 is linked to a meter index, not shown, in which dials are rotated to show the quantity of gas passing through the meter. Crank post and valve drive mechanism 15 is also connected through diaphragm control rods 38, 39, as shown in FIGS. 1 and 2, to diaphragm arms 16 which in turn are connected to diaphragms 40, 41. Thus, as gas flows through the meter, the diaphragms are oscillated causing the crankpost and valve drive mechanism 15 to rotate crankpost 18 and gear 17, resulting in rotation of the meter index dials based upon the amount of gas flowing through the meter.

Figure 11:
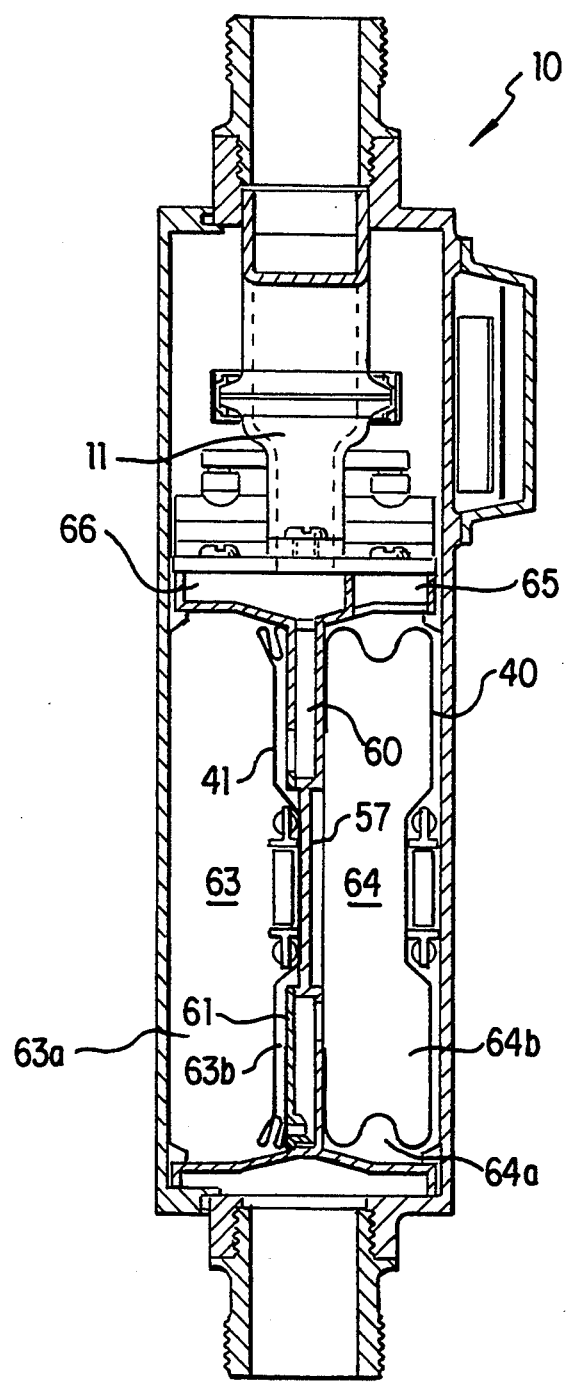
FIG. 11 is a cross-sectional side view of the gas meter shown in FIG. 1.

As shown more clearly in FIGS. 2 and 11, a front diaphragm 40 and a back diaphragm 41 are disposed within the lower portion of gas meter 10 which is divided into front lower meter chamber 64 and back lower meter chamber 63 by partition 57. Thus, front diaphragm 40 is disposed within front lower chamber 64 and back diaphragm 41 is disposed within back lower chamber 63. In this manner, the lower portion of gas meter 10 is divided into four metering chambers, back outer meter chamber 63a, back inner meter chamber 63b, front inner meter chamber 64b, and front outer meter chamber 64a.

As previously stated, designing a 4-chamber gas meter having a small front-to-back dimension and parallel reciprocating valves poses kinematic problems for the crankpost and valve drive mechanism. In a 4-chamber meter in accordance with this invention, a relatively uniform driving torque from the diaphragms 40, 41 to the crankpost is provided by the two diaphragms 40, 41 oscillating essentially 90° out of phase. In accordance with one embodiment of this invention, the motion of the two diaphragms 40, 41 is provided to the crank post by means of a common crankpin. In accordance with a preferred embodiment of this invention, the links 23, 25 which connect the flag arms 21, 24 to the crankpin 20 have a substantially greater length than the diameter of the crankpin motion, thereby improving the uniformity of driving torque. Each stroke of each diaphragm 40, 41, inward motion of the diaphragm being one stroke and outward motion of the diaphragm being another stroke, occurs during 180° rotation of crankpost 18. In this manner, valve timing can be equally coordinated to the ends of all four diaphragm strokes.

Figure 3:
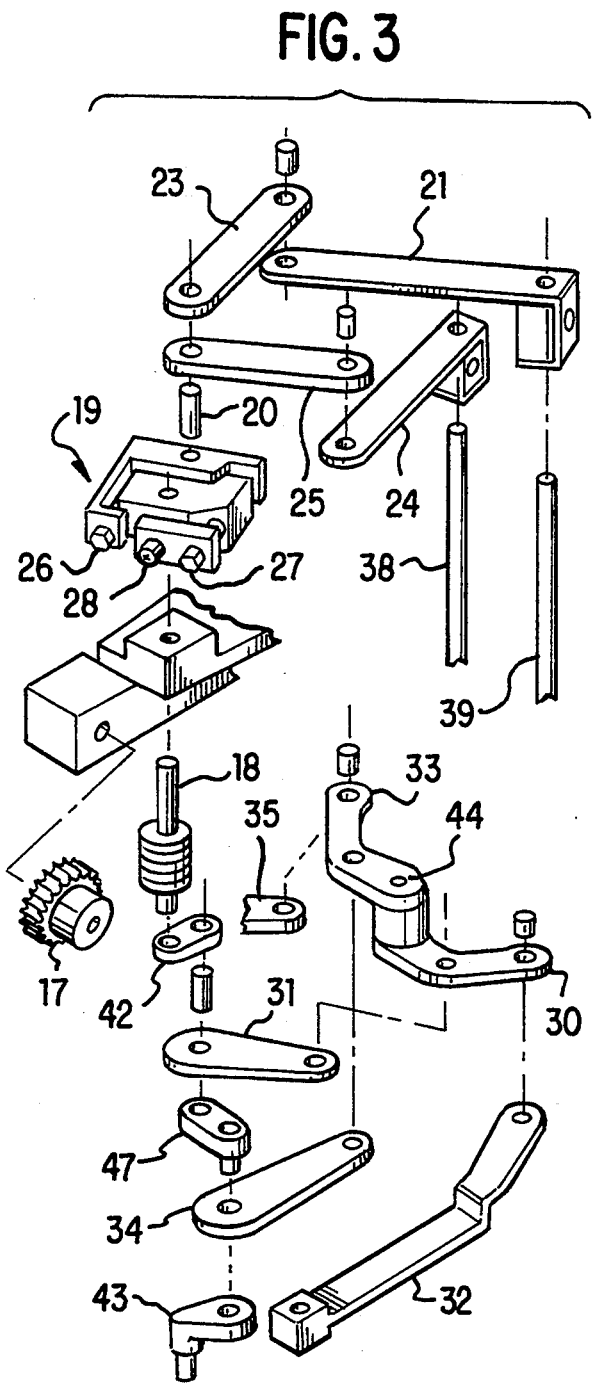
FIG. 3 is an exploded view of a crankpost, adjustment mechanism and valve actuating mechanism for a 4-chamber gas meter in accordance with one embodiment of this invention.
Figure 5:
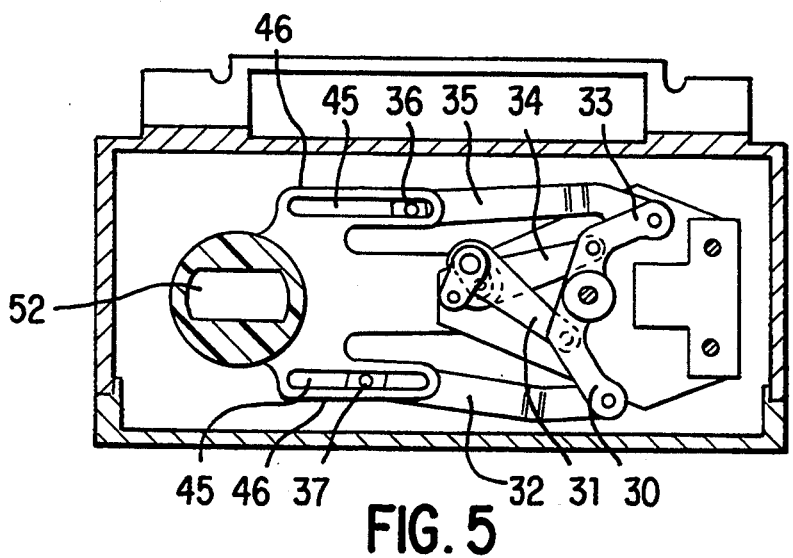
FIG. 5 is a plan view of a valve actuating mechanism for a 4-chamber gas meter in accordance with one embodiment of this invention.
Figure 6:
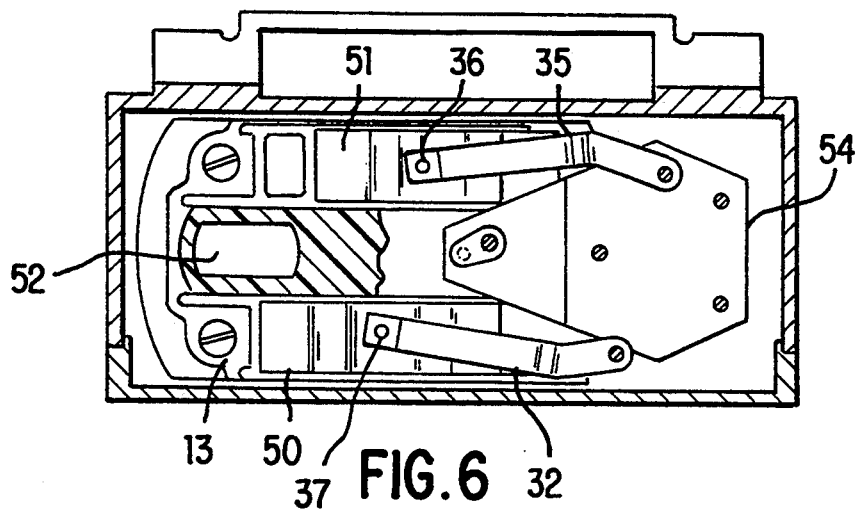
FIG. 6 is a plan view of a valve plate of a 4-chamber gas meter in accordance with one embodiment of this invention with side by side valves which reciprocate in a direction parallel to one another.

A crankpost and valve drive mechanism in an exploded view of a compact 4-chamber gas meter in accordance with one embodiment of this invention is shown in FIG. 3. FIGS. 4, 5 and 6 show a top view of the crankpost mechanism, valve drive mechanism, and valve plate, respectively. FIG. 4 is a view of meter 10 in the direction 4—4 as shown in FIG. 1; FIG. 5 is a view of meter 10 in the direction 5—5 as shown in FIG. 1; and FIG. 6 is a view in the direction 6—6 as shown in FIG. 1.

As shown in FIG. 3, the crankpost mechanism comprises back diaphragm flag arm 21 connected at one end to back diaphragm control rod 39 which, in turn, is connected through diaphragm arm 16 to back diaphragm 41 and pivotally connected at the opposite end to one end of back diaphragm flag arm connecting link 23. Similarly, front diaphragm flag arm 24 is connected at one end to front diaphragm control rod 38. The opposite end of front diaphragm flag arm 24 is pivotally connected to one end of front diaphragm flag arm connecting link 25. The ends of back diaphragm flag arm connecting link 23 and front diaphragm flag arm connecting link 25 opposite the ends connected to back diaphragm flag arm 21 and front diaphragm flag arm 24, respectively, are pivotally connected to crankpin 20. Crankpin 20 is eccentrically disposed and connected to adjustment mechanism 19. Crankpost 18 is rotationally centered with respect to and connected at one end to adjustment mechanism 19. Crankpost 18 comprises a worm which drives meter index gear 17 when rotated.

As previously stated, in accordance with the 4-chamber meter of this invention, the stroke of each diaphragm 40, 41 in either direction corresponds to a 180° rotation of crankpost 18. Valve members 50, 51 shift near the center position of their strokes. To coordinate the shifting function to each end position of the diaphragm motion requires 180° crankpost rotation for valve member 50, 51 to go from the shifting position to one end of its stroke and back to the shifting position and then another 180° for valve member 50, 51 to go out to the other end of its stroke and back. This occurs during one diaphragm phase stroke. The valve drive mechanism in accordance with this invention divides the diaphragm motion into two 180° strokes while moving valve member 50, 51 from a shifting position out to one end and back during the first stroke. The second stroke occurs from the shifting position out to the other end and back.

The valve drive mechanism in accordance with the gas meter of this invention strokes valve members that are laid parallel to each other rather than in the traditional 90° space relationship. In accordance with one embodiment of this invention, this requires two crankthrows 42, 43 on the bottom of crank post 18. To further accomplish the desired valve strokes, the valve drive mechanism comprises two separate mechanisms, one on each side of meter 10 for each valve member 50, 51, arranged on different crankthrows. Accordingly, the valve drive mechanism in accordance with one embodiment of this invention comprises front valve intermediate arm 33 pivotally connected at one end to front valve drag link 35. The opposite end of front valve intermediate arm 33 is pivotally connected to pivot pin 44. Similarly, one end of back valve intermediate arm 30 is pivotally connected to pivot pin 44 and the opposite end of back valve intermediate arm 30 is pivotally connected to back valve drag link 32.

Pivotally connected to front valve intermediate arm 33 at a point between the ends connected to front valve drag link 35 and pivot pin 44 is one end of front valve crank link 34. Similarly, one end of back valve crank link 31 is pivotally connected to back valve intermediate arm 30 at a point between the ends connected to back valve drag link 32 and pivot pin 44. The end of said front valve crank link 34 opposite the end connected to front valve intermediate arm 33 is pivotally connected to crankthrow 43 while the end of back valve crank link 31 opposite the end connected to back valve intermediate arm 30 is pivotally connected to crankthrow 42. Said ends of said crank links 31, 34 connected to crankthrows 42, 43 are also pivotally connected to one another by connecting link 47. The free end of crankthrow 42 is connected to the bottom of crankpost 18. The free end of crankthrow 43 comprises a pin pivotally seated in a bore in support bracket 54 as shown in FIG. 6. The end of back valve drag link 32 opposite the end connected to back valve intermediate arm 30 is pivotally connected to guide pin 37 extending from back valve member 50. Similarly, the end of front valve drag link 35 opposite the end connected to front valve intermediate arm 33 is pivotally connected to guide pin 36 extending from front valve member 51. As shown in FIG. 5, discharge 11 transforms into parallel extensions 46 which form slots 45 in which guide pins 36, 37 oscillate as the valve members are reciprocated by the valve drive mechanism.

Figure 4A:
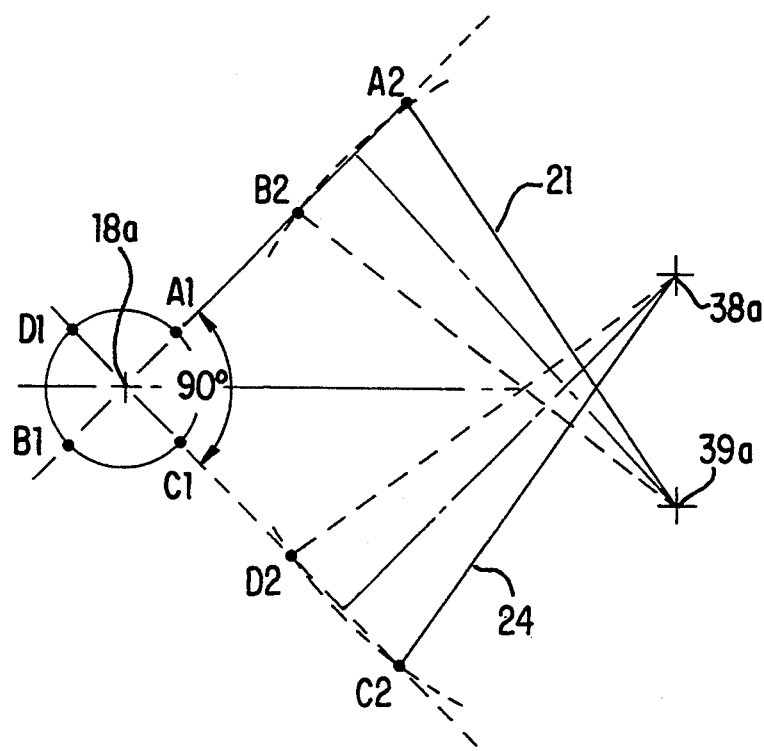
FIG. 4a is a schematic diagram of the crankpost mechanism kinematics in accordance with one embodiment of this invention.
Figure 4:
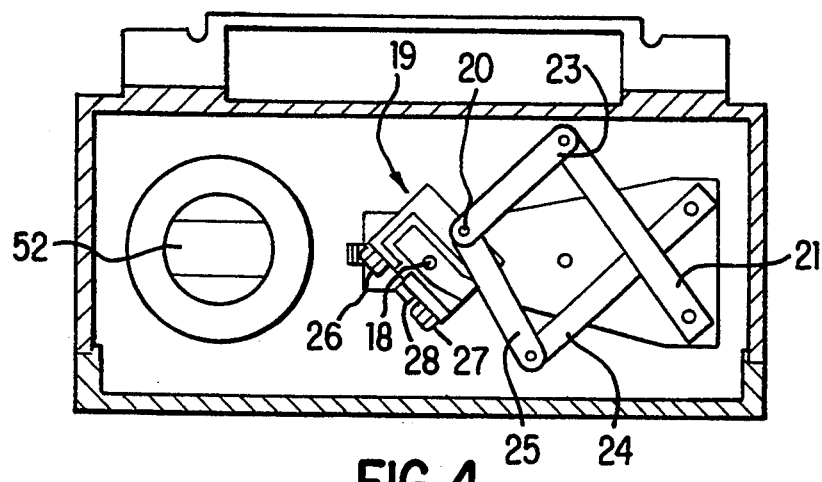
FIG. 4 is a plan view of a crankpost mechanism for a 4-chamber gas meter in accordance with one embodiment of this invention.

FIG. 4a is a schematic diagram showing the crankpost kinematics of the crankpost mechanism in accordance with one embodiment of this invention. Points A1, B1, C1, and D1 all lie on the swing radius of the crankpin. Points A2 and B2 represent the extremes for the pivotal movement of back diaphragm flag arm 21 around pivot 39a based upon the corresponding stroke of back diaphragm 41 and points C2 and D2 represent the extremes for the pivotal movement of front diaphragm flag arm 24 around pivot 38a based upon the corresponding stroke of front diaphragm 40. Points A1, A2, B1, and B2 lie on a common line through the center of rotation 18a of the crankpost. Points C1, C2, D1, and D2 also lie on a common line through the crankpost center of rotation 18a. The two common lines are disposed at 90° angles to each other. This mechanism produces 180° of crankpost rotation for all four strokes of the meter and in a 90° phase relationship between the motions of the diaphragms.

Figure 5A:
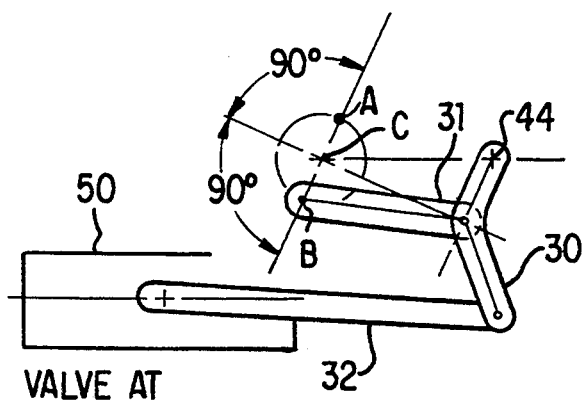
FIG. 5a is a schematic diagram of the valve drive kinematics of the valve drive mechanism in accordance with one embodiment of this invention.

FIG. 5a is a schematic diagram showing the valve drive kinematics for the valve drive mechanism in accordance with one embodiment of this invention. Points A and B represent the positions of crankthrow 42 when back valve member 50 passes through its shifting position near center. Points A, B and the crankpost center C are on a common line. In accordance with this design, 180° of crankpost rotation are required to return back valve member 50 to the shifting position in either direction of movement. A separate crankthrow and valve drive mechanism drives the front valve member 51. It is necessary that the crankthrows 42, 43 have the correct angle between them to provide the required 90° of crankpost rotation between the shifting points of the front and back valves.

Gas meter 10 in accordance with one embodiment of this invention further comprises adjustment mechanism 19 for adjustment of the length of the strokes by changing the distance from the axis of rotation of crankpost 18 out to the crankpin 20 and variation of the phase relationship by, in effect, shifting the crankpin 20 angularly relative to its position on the crankpost 18. Adjustment mechanism 19 as shown in FIG. 13a through 13h comprises frame member 72 having first leg 73, second leg 74 parallel to and shorter than first leg 73, and connecting member 75 connecting first leg 73 to second leg 74 at their ends. First leg 73 has extension 77 in which is formed guide slot 78 as shown in FIG. 13c. Disposed within area 76 formed by frame member 72 is center block 80 which forms slot 81 to produce a U-shaped longitudinal cross-section. Adjustment mechanism 19 further comprises angular phase adjustment block 90 having an L-shaped profile whereby one leg of said L is insertable into slot 81 of center block 80. Center block 80 and said leg of angular phase adjustment block 90 which is insertable into slot 81 of center block 80 form aligned throughbores through which crankpost 18 is inserted. First leg 73 and second leg 74 of frame member 72 together with center block 80 form aligned threaded throughbores 79a, 79b through which crank radius adjustment screw 26 is inserted. In the area of the ends of the legs of U-shaped center block 80 as shown in FIG. 13e is formed center block throughbore 83 into which pivot pin 82 as shown in FIG. 13h is inserted. Pivot pin 82 forms throughbore 84 perpendicular to the longitudinal axis of pivot pin 82. The free end 91 of angular phase adjustment block 90 forms throughbore 92 which aligns with guide slots 78 of frame member 72 and throughbore 84 of pivot pin 82 when adjustment mechanism 19 is assembled, thereby enabling the insertion of angular phase adjustment screw 27. Disposed around angular phase adjustment screw 27 between center block 80 and angular phase adjustment block 90 is spring 85. Set screw 28 as shown in FIG. 13d is provided to secure adjustment mechanism 19 firmly to crankpost 18 at a predetermined position prior to the final adjustment of the angular phase and crank radius adjustment screws.

Figure 7:
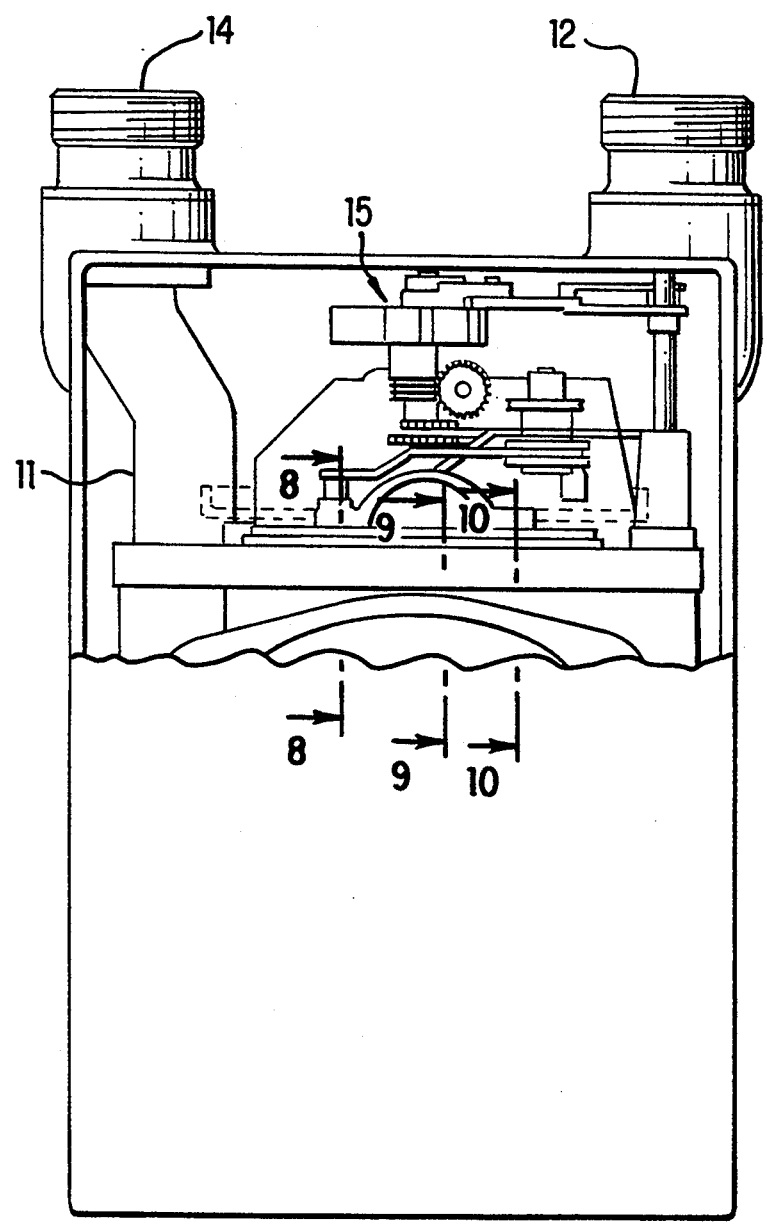
FIG. 7 is a rear view with cutaway of a 4-chamber gas meter in accordance with another embodiment of this invention.
Figure 8:
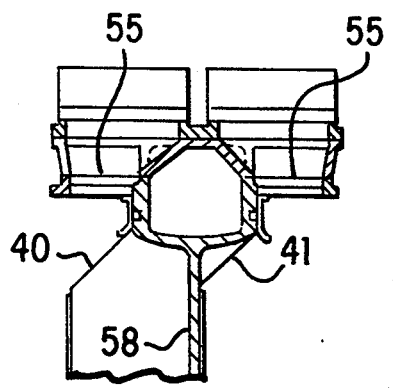
FIG. 8 is a partial cross-sectional view of the gas meter shown in FIG. 7 along the line 8—8.
Figure 9:
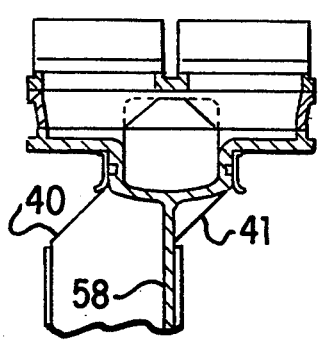
FIG. 9 is a partial cross-sectional view of the gas meter shown in FIG. 7 along the line 9—9.
Figure 10:
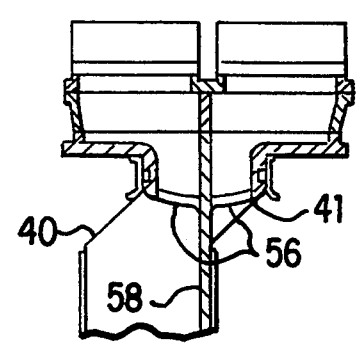
FIG. 10 is a partial cross-sectional view of the gas meter shown in FIG. 7 along the line 10—10.

FIG. 7 shows a partial cutaway of a four-chamber compact gas meter in accordance with another embodiment of this invention. FIG. 8 is a cross-sectional view of the meter shown in FIG. 7 in the direction of line 8—8. FIG. 9 is a cross-sectional view of the meter shown in FIG. 7 in the direction of line 9—9. FIG. 10 is a cross-sectional view of the meter shown in FIG. 7 along the line 10—10. As shown in FIG. 8, gas flow to the outer meter chambers 63a, 64a, that is, the meter chambers disposed between the diaphragms 40, 41 and the meter housing is provided through outer meter chamber flow ports 55. Similarly, gas flow to the inner meter chambers 63b, 64b, that is, the metering chambers disposed between the diaphragms 40, 41 and partition 58 separating the front and back lower chambers 63, 64 is provided through inner meter chamber ports 56 as shown in FIG. 10. FIG. 9 is a cross-sectional view at the position of valve members 50, 51 where the gas flowing through valve members 50, 51 is discharged to a centered flow passage for discharge through lower body discharge 52 shown in FIG. 4 and subsequently through discharge 11.

Figure 11A:
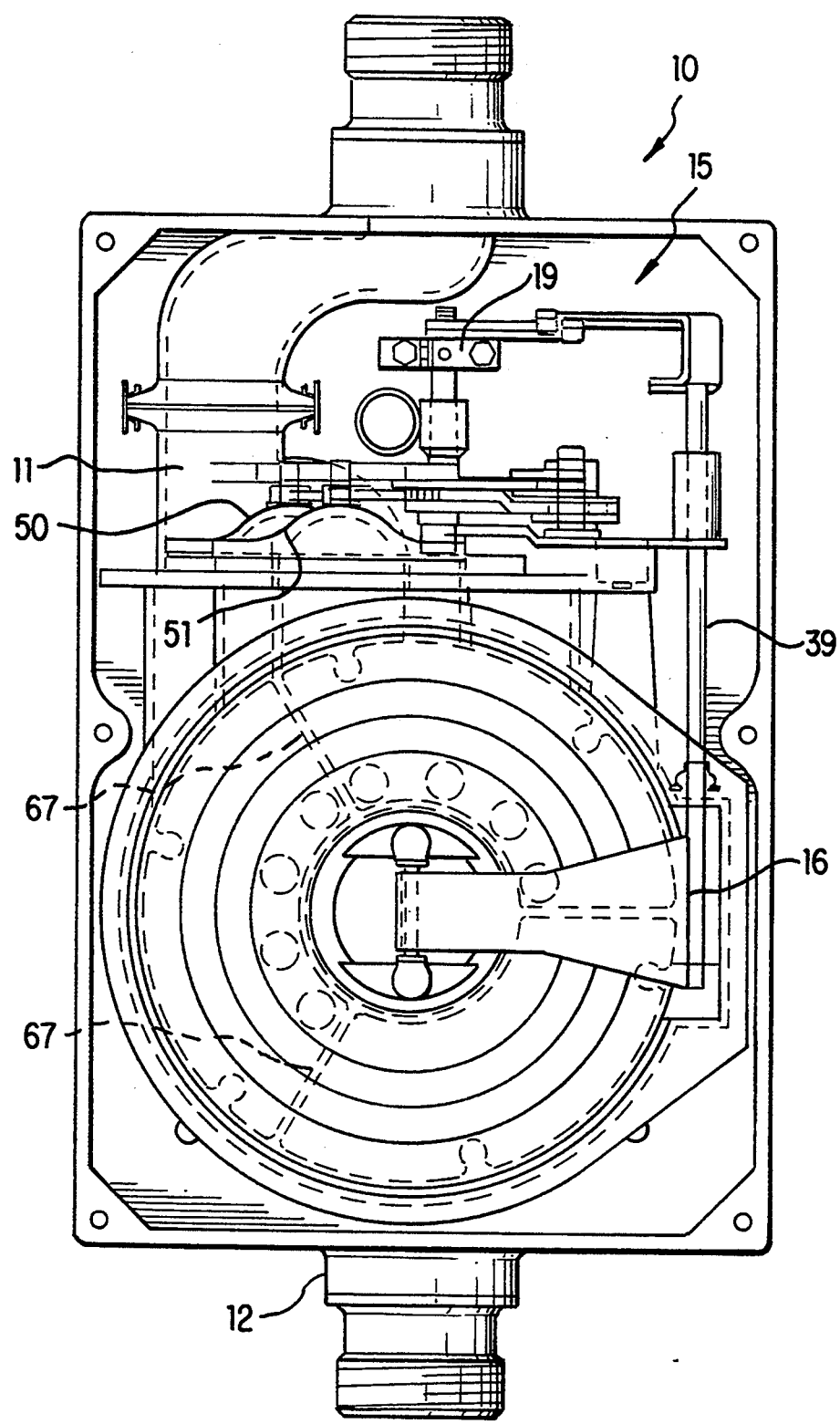
FIG. 11a is a back view of the gas meter shown in FIG. 11.

FIG. 11 is a cross-sectional side view of a four-chamber compact gas meter in accordance with one embodiment of this invention where front diaphragm 40 and back diaphragm 41 are in the form of convoluted lobe-type diaphragms. FIG. 11a is a back view of the gas meter shown in FIG. 11. Attachment to the lower chamber box is at the inner ends of the diaphragm. This embodiment further comprises a divided center feed chamber 60 between back lower chamber 63 and front lower chamber 64. Center feed chamber 60 is provided with transverse dividing ribs 67 to form a first subchamber is in communication with front valve member 50 and front meter chamber 64 and a second subchamber is in communication with back valve member 51 and back meter chamber 63 between the main chambers. One quarter of the gas flows down one side of center feed chamber 60 to one side of front diaphragm 40 and the other quarter of the gas flows down the other side of center feed chamber 60 to one side of back diaphragm 41. Center feed chamber 60 is formed on one side by partition 57 between front lower chamber 64 and back lower chamber 63, partition 57 comprising a plurality of walls which can be molded in a single die cast operation, and a separate plate 61 which closes off the chamber.

Figure 12:
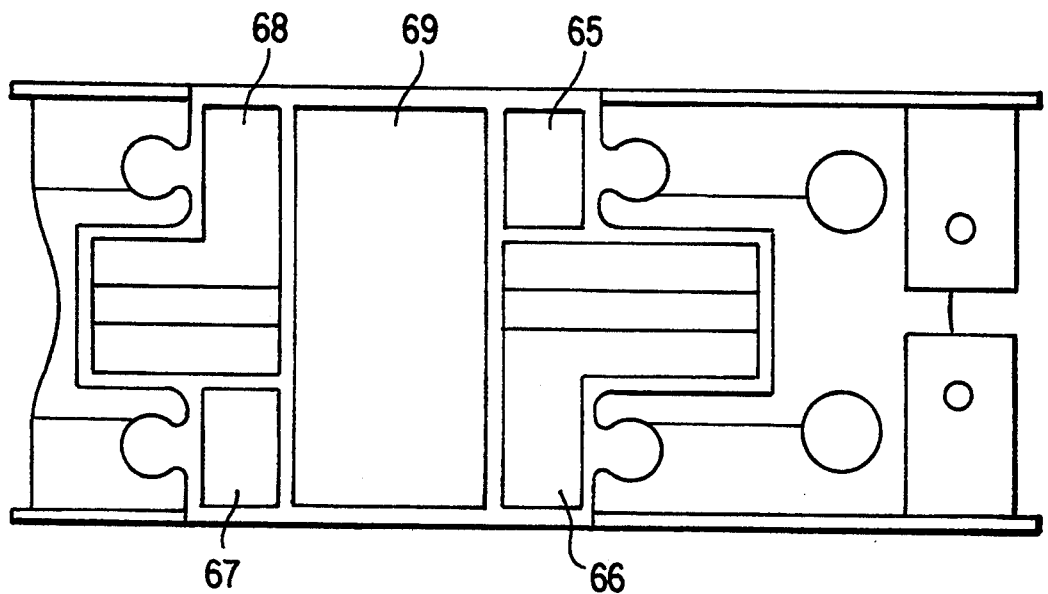
FIG. 12 is a top view of the metering chamber housing of the gas meter shown in FIG. 11.

FIG. 12 shows a top view of the metering chambers of the embodiment of the meter shown in FIG. 11. In accordance with this embodiment, flow port 65 provides flow of gas to and from front outer meter chamber 64a. Flow port 66 provides gas flow to and from back inner meter chamber 63b. Flow port 67 provides gas flow to and from back outer meter chamber 63a. Flow port 68 provides gas flow to and from front inner meter chamber 64b. Port 69 provides flow of gas to discharge 11.

Figure 12A:
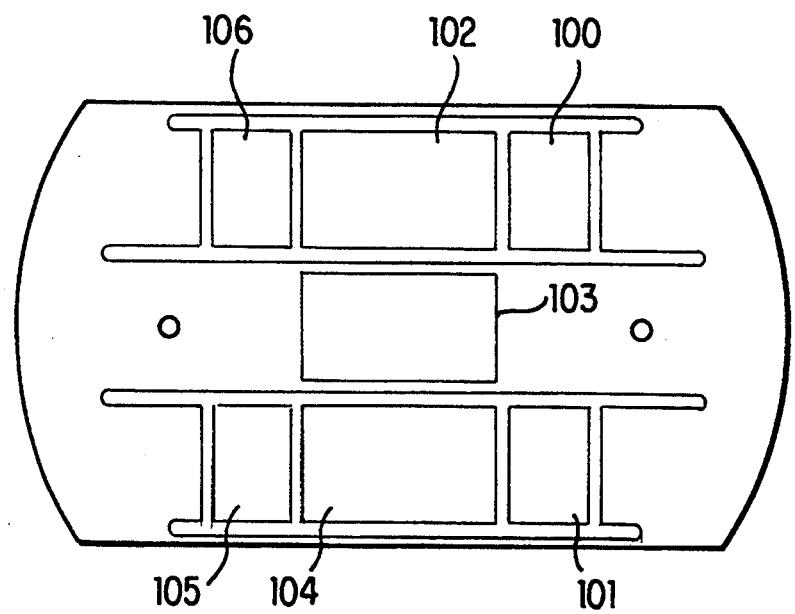
FIG. 12a is a top view of a valve plate for a gas meter in accordance with one embodiment of this invention.

FIG. 12a shows a top view of a valve plate for a gas meter in accordance with the embodiment of this invention shown in FIG. 11 having front outer meter chamber port 100 which provides gas flow to and from front outer meter chamber 64a, back inner meter chamber port 101 which provides gas flow to and from back inner meter chamber 63b front discharge port 102 which provides downward flow of gas from front inner meter chamber 64b and front outer meter chamber 64a to discharge 11, back discharge port 104 which provides downward flow of gas from back inner meter chamber 63b and back outer meter chamber 63a to discharge 11, center port 103 which provides upward flow of gas to discharge 11, front inner meter chamber port 106 which provides gas flow to and from front inner meter chamber 64b and back outer meter chamber port 105 which provides gas flow to and from the back outer meter chamber 63a.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In a gas meter having a housing with an inlet passage and an outlet passage, a front pair of meter chambers disposed in a front area of a lower portion of said housing and a back pair of meter chambers disposed in a back area of said lower portion of said housing, a first and second reciprocating valve disposed above said meter chambers in a side by side relationship to communicate said meter chambers alternately with said inlet passage and said outlet passage, a front diaphragm disposed in said lower portion of said housing separating said front meter chambers and a back diaphragm disposed in said lower portion of said housing separating said back meter chambers, each said diaphragm corresponding to one of said first and second reciprocating valves, and means for actuating said first and second reciprocating valves, the improvement comprising:

means for driving said first and second reciprocating valves and means for driving said front and back diaphragms mechanically linked by a crankpost to said means for driving said first and second reciprocating valves whereby each said reciprocating valve moves from a stroke shifting point proximate a center stroke point to a stroke endpoint and back to said stroke shifting point with each 180° rotation of said crankpost and each stroke of each said diaphragm occurs over said 180° rotation of said crankpost.

2. In a gas meter in accordance with claim 1, wherein said means for driving said first and second reciprocating valves and said diaphragms comprises a crankpost mechanism comprising a back flag arm operably connected at a back diaphragm end to said back diaphragm, a front flag arm operably connected at a front diaphragm end to said front diaphragm, a back flag arm connecting link pivotally connected at one end to the end of said back flag arm opposite said back diaphragm end, a front flag arm connecting link pivotally connected at one end to the end of said front flag arm opposite said front diaphragm end, a crankpin pivotally connected to the ends of said connecting links distal from said ends connected to said flag arms, said crankpin eccentrically disposed and connected to an adjustment means for adjusting a stroke length of said first and second reciprocating valves, said crankpost rotationally centered with respect to and connected at one end to said adjustment means, and said flag arms being equal in length and said connecting links being equal in length.

3. In a gas meter in accordance with claim 2, wherein said means for driving said first and second reciprocating valves and said diaphragms further comprises a valve drive mechanism comprising a first crankthrow connected at one end to said crankpost, a first valve crank link pivotally connected at one end to the opposite end of said first crankthrow, a first valve intermediate arm pivotally connected to the opposite end of said first valve crank link intermediate the ends of said first valve intermediate arm, a second valve crank link pivotally connected at one end to a second crankthrow, a second valve intermediate arm pivotally connected to the opposite end of said second valve crank link intermediate the ends of said second valve intermediate arm, the second crankthrow pivotally connected at one end to said one end of said second valve crank link, the opposite end of said second crankthrow being connected to said crankpost whereby said opposite end of said second crankthrow and said crankpost rotate around a common axis, a first valve drag link pivotally connected at one end to one end of said first valve intermediate arm, a second valve drag link pivotally connected at one end to said second valve intermediate arm, the opposite end of each of said first valve intermediate arm and said second valve intermediate arm pivotally connected to each other, and the opposite ends of said first valve drag link and said second valve drag link connected to one of said first and second reciprocating valves.

4. In a gas meter in accordance with claim 1, wherein said front area of said lower portion of said housing and said back area of said lower portion of said housing are separated by a partition, said partition comprising a plurality of walls forming a center feed chamber between said front pair of meter chambers and said back pair of meter chambers, said center feed chamber having at least one transverse dividing rib separating said center feed chamber into a first subchamber and a second subchamber, said first subchamber in communication with said first valve and said front meter chambers and said second subchamber in communication with said second valve and said back meter chambers.

5. In a gas meter in accordance with claim 1, wherein said means for driving said first and second reciprocating valves and said diaphragms comprises said crankpost, a crankpin and adjustment means for adjusting a stroke length of said first and second reciprocating valves, said adjustment means comprising means for adjusting a distance from an axis of rotation of said crankpost to said crankpin and for shifting said crankpin angularly relative to said crankpost mechanically linking said crankpost and said crankpin.

6. In a gas meter in accordance with claim 5, wherein said adjustment means comprises a center block, a frame member enclosing a portion of said center block and mechanically linked to said center block, and an angular phase adjustment block mechanically linked to said center block and disposed on a side of said center block unenclosed by said frame member.

7. In a gas meter in accordance with claim 6, wherein said frame member comprises a first leg, a second leg parallel to and shorter than said first leg, a connecting member connecting a first end of said first leg to a first end of said second leg, and an extension member connected to a second end of said first leg, said extension forming a guide slot.

8. In a gas meter in accordance with claim 7, wherein said center block forms a slot whereby said center block has a U-shaped longitudinal cross-section.

9. In a gas meter in accordance with claim 8, wherein said angular phase adjustment block has an L-shaped profile, one leg of said L-shaped angular phase adjustment block insertable into said slot of said center block.

10. In a gas meter in accordance with claim 9, wherein said center block and said leg of said L-shaped angular phase adjustment block have aligned throughbores, said crankpost insertable through said aligned throughbores, said first leg and said second leg of said frame member and said center block having an aligned threaded throughbore into which a crank radius adjustment screw is inserted, said first leg of said frame member forms a crankpin throughbore into which said crankpin is insertable, said ends of said U-shaped center block form an aligned center block throughbore into which a pivot pin having a pivot pin throughbore perpendicular to the longitudinal axis of said pivot pin, said angular phase adjustment block forming an angular phase block throughbore aligned with said guide slot in said first leg extension of said frame member and said pivot pin throughbore into which is inserted an angular phase adjustment screw.

11. In a gas meter in accordance with claim 10 further comprising a spring disposed around said angular phase adjustment screw between said center block and said angular phase adjustment block.

12. In a gas meter in accordance with claim 1 further comprising a valve plate disposed between said means for driving said first and second reciprocating valves and said lower portion of said housing, said valve plate forming, aligned in the direction of the first valve stroke of said first valve member, at one end of said first valve stroke, a first front communication between said first valve member and a front outer meter chamber in said front area of said lower portion of said housing, a second front communication at the opposite end of said stroke between said first valve member and a front inner meter chamber in said front area of said lower portion of said housing, and a third front communication between said first valve member, said front pair of meter chambers and a discharge, said third front communication disposed between said first front and second front communications, and aligned in the direction of the second valve stroke of said second valve member parallel to the first valve stroke of said first valve member, a first back communication between said second valve member and a back outer meter chamber in said back area of said lower portion of said housing disposed in said valve plate opposite said second front communication, a second back communication at the opposite end of said second valve stroke between said second valve member and a back inner meter chamber in said back area of said lower portion of said housing disposed in said valve plate opposite said first front communication, and a third back communication between said second valve member, said back pair of meter chambers and said discharge, said third back communication disposed in said valve plate opposite said third front communication.

* * * * *